United States Patent [19]
Arntson et al.

[11] Patent Number: 5,813,110
[45] Date of Patent: Sep. 29, 1998

[54] LOW-VOLTAGE ELETROMAGNETIC RIVETER

[75] Inventors: Paul R. Arntson, Bothell; Martin A. Karge, Bellevue, both of Wash.

[73] Assignee: The Boeing Company, Seattle, Wash.

[21] Appl. No.: 598,897

[22] Filed: Feb. 9, 1996

[51] Int. Cl.[6] .............................. B23P 19/00; B21J 15/24
[52] U.S. Cl. ..................... 29/701; 29/243.53; 29/243.54; 72/56; 72/430
[58] Field of Search ........................ 29/701, 715, 243.53, 29/243.54, 525.06; 72/56, 430

[56] References Cited

U.S. PATENT DOCUMENTS

| | | |
|---|---|---|
| 3,496,378 | 2/1970 | Sakamoto . |
| 3,504,191 | 3/1970 | Rodewald . |
| 3,746,881 | 7/1973 | Fitch et al. . |
| 3,821,561 | 6/1974 | Feser . |
| 4,109,216 | 8/1978 | Nyswander . |
| 4,639,611 | 1/1987 | Sticher . |
| 4,694,373 | 9/1987 | Demeyer . |
| 4,862,043 | 8/1989 | Zieve . |
| 4,924,343 | 5/1990 | Niemi . |
| 4,990,805 | 2/1991 | Zieve . |
| 4,994,933 | 2/1991 | Matsuoka . |
| 5,065,104 | 11/1991 | Kusko et al. . |
| 5,105,325 | 4/1992 | Lawrence . |
| 5,177,657 | 1/1993 | Baer et al. . |
| 5,179,490 | 1/1993 | Lawrence . |
| 5,345,161 | 9/1994 | Zieve ............................................ 320/1 |
| 5,471,865 | 12/1995 | Michalewski et al. .................... 72/430 |
| 5,521,782 | 5/1996 | Zieve ......................................... 361/42 |
| 5,575,166 | 11/1996 | Michalewski et al. ...................... 72/56 |

OTHER PUBLICATIONS

P.B. Zieve, Low Voltage Electromagnetic Riveter, Ph.D. Dissertation, University of Washington, May 30, 1986.

*Primary Examiner*—S. Thomas Hughes
*Attorney, Agent, or Firm*—Christensen, O'Connor, Johnson & Kindness PLLC

[57] ABSTRACT

A low-voltage electromagnetic riveter (LVEMR) including two opposed rivet guns (70, 72) for upsetting rivets during the assembly of structural parts is disclosed. Variable capacitor banks (64, 65 or 64', 65') are discharged to provide a variable current pulse which flows through a driver coil (131) and a mass-mounted coil (135) of each rivet gun (70, 72). Preferably, the mating faces of the coils are contoured to assist in the alignment of the coils. The driver coils are affixed to the ends of drivers (125) that drive rivet dies (121) into the ends of a rivet (75) to be upset. The LVEMR is controlled such that the net magnetic forces generated between the two pairs of coils actuate the rivet guns (70, 72) so that one end of the rivet is impacted slightly before the other end. The delay is controlled by a delay generator (44). Further, rapid-acting ground fault detection circuits (52 and 53) cause a power shutdown and capacitor bank discharge in the event of a ground fault. Excessive capacitor bank voltage or rivet gun temperatures also can cause a power shutdown and capacitor bank discharge.

27 Claims, 11 Drawing Sheets

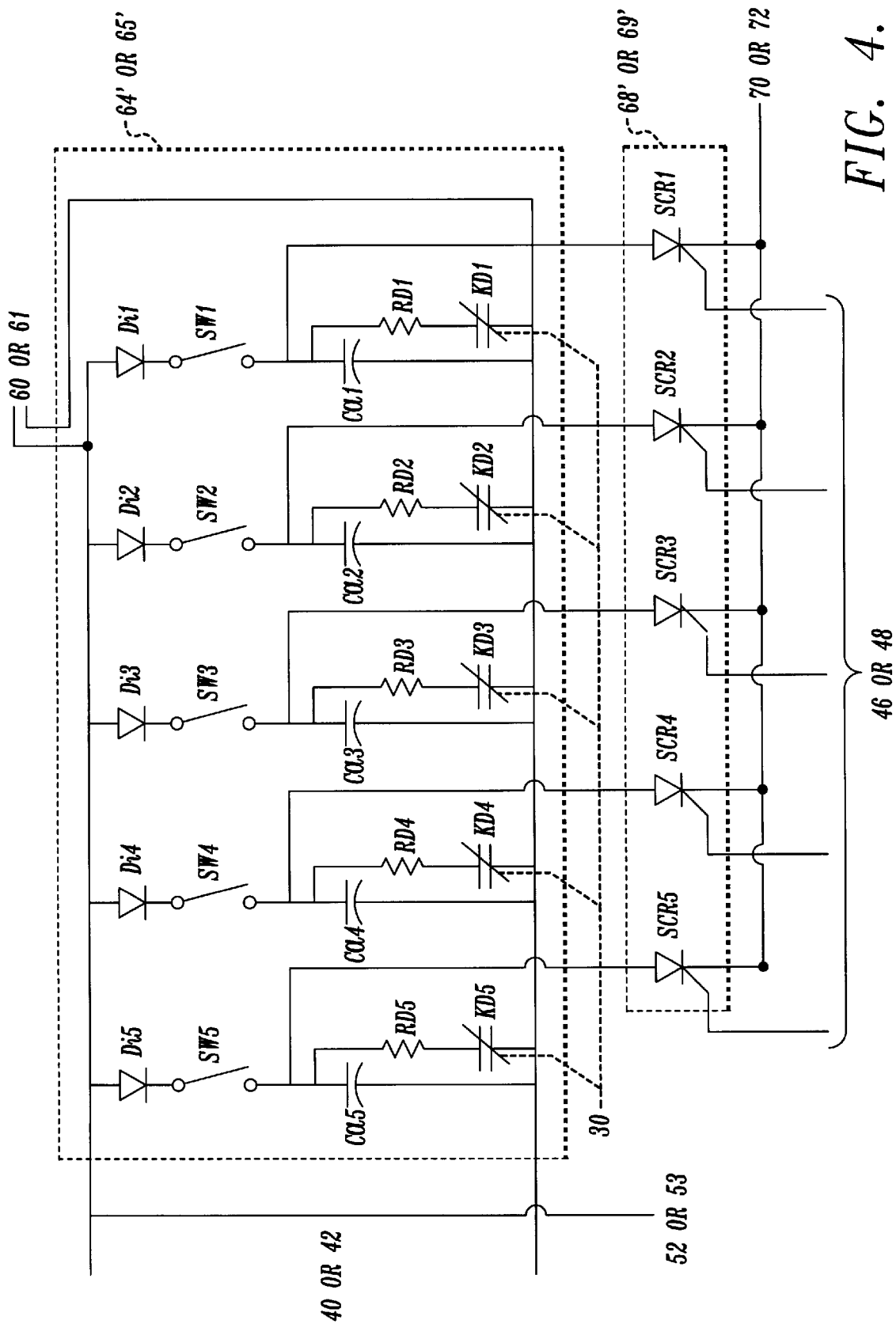

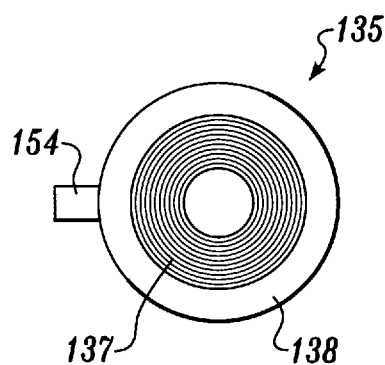
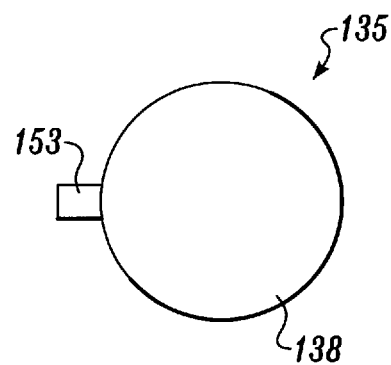
FIG. 10.    FIG. 11.
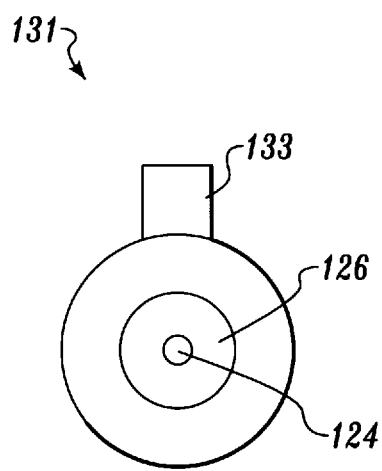
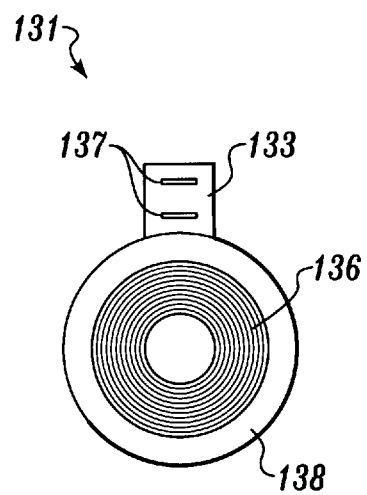
FIG. 12.    FIG. 13.

LOW-VOLTAGE ELETROMAGNETIC RIVETER

FIELD OF THE INVENTION

This invention is directed to riveting apparatus and, more particularly, to low-voltage electromagnetic riveting apparatus.

BACKGROUND OF THE INVENTION

While, as will be better understood from the following description, the present invention was developed for upsetting rivets during the formation of aerospace structures, such as the spar sub-assemblies incorporated into the wings of aircraft, this invention may also find utility in other environments.

Rivets are widely used in aerospace structures to join parts together. They are used in the creation of sub-assemblies, such as the spar sub-assemblies used in aircraft wings, as well as to join the skin of an aircraft to structural sub-assemblies. Rivet material varies from relatively malleable aluminum to high-strength aluminum and titanium alloys. Rivets are created by passing a rivet blank through aligned holes in the parts to be joined and creating a head on at least one end of the rivet. That is, rivet blanks may have a preformed head on one end, or have no heads on either end prior to installation. In the case of a rivet with a preformed head, a head is only created on the non-headed end during installation. In contrast, a rivet blank with a head on neither end has heads formed on both ends during installation. The formation of rivet heads during installation is commonly referred to as upsetting, since the head is formed by molding or upsetting the rivet material as the head is being formed. As will be better understood from the following discussion, the present invention is directed to upsetting rivets that are non-headed at both ends prior to installation.

The use of rivets to join parts together predates modem commercial jet aircraft. In the early days of commercial jet aircraft production, pneumatic vibrating guns and buckling bars were used by large riveting machines to upset rivets. Hydraulic squeezing machines were also employed. Some of these machines are still employed.

Pneumatic vibrating gun and buckling bar machines have many disadvantages that make them unsuitable for use in the creation of critical aircraft structures, such as wingspar sub-assemblies. The major disadvantage of such machines is their inability to produce consistent quality joints having a high fatigue life. Another disadvantage is the substantial gun vibration noise produced by such machines. Further, such machines are generally incapable of upsetting large-sized aluminum rivets or high-strength alloy rivets.

Hydraulic riveting machines have other disadvantages. One disadvantage is that opposing riveting forces are resisted through structural members that reach around the parts being joined. The structural members become massive as the size of the parts becomes large.

As a result of the foregoing disadvantages of pneumatic and hydraulic rivet upsetting machines, electromagnetic riveters (EMRs) have been developed. An EMR is a riveter that uses electrical energy to produce the impact force needed to upset rivets. The force is developed by discharging the energy stored in a charge capacitor bank through a coil. More specifically, an EMR includes two rivet guns positioned in contact with, and on opposite sides of, an unformed rivet. Each gun consists of a coil, a driver, and a recoil mass. The drivers are located between their respective coils and the related end of the rivet, in contact with the rivet, and the recoil mass is located on the side of the coils opposite the driver. EMR drivers are solid metal assemblies having a conductive plate in the form of a copper layer on the coil end of the assembly. A rivet die is located on the other end of the assembly, i.e., the end in contact with the rivet. The rivet die determines the shape of the rivet head. When the capacitor bank is discharged, the electromagnetic field created by the rapidly rising coil currents induces eddy currents in the copper cladding. The induced eddy currents produce a counteracting magnetic field. The interaction of the coil magnetic fields with the eddy current magnetic fields produces a strong repulsion force that moves the drivers of the EMR rivet guns toward one another, upsetting the rivet.

Early EMRs included high-voltage (10 KVDC) capacitor banks and power was simultaneously applied to the coils of both rivet guns, which were connected in series. The simultaneous operation of two high-voltage EMR (HVEMR) rivet guns is necessary because the operation of two guns in a non-simultaneous manner can create unbalanced forces that can damage the parts being assembled. In this regard, the force produced by an HVEMR is of very short duration due to the rapid discharge of the capacitors. This results in the reaction force of the riveting process being stored momentarily in the kinetic energy of the recoil mass. More specifically, subsequent to a rivet upset pulse, the two rivet guns are each set into rearward motion away from the parts being assembled. The HVEMR guns are decelerated by the recoil mass and the restraining force created by the support structure. Recoilless operation is an essential feature of an HVEMR intended to be used on structures that cannot bear more than a fraction of the reaction force (65 kNt) produced by such riveters.

Because HVEMR current pulse rise time is usually less than 100 microseconds, the current pulse is exhausted in advance of appreciable deformation of the rivet. This leads to one of the major disadvantages of HVEMRs. Specifically, the interaction of the driver masses with the rivet results in an extremely high rate of deformation, which frequently causes cracks in the rivet heads.

In order to overcome the disadvantages of HVEMRs, low-voltage electromagnetic riveters (LVEMRs) have been proposed, and are in use. LVEMRs are similar in many ways to HVEMRs in the sense that they include two rivet guns that are in direct contact with and located on opposite sides of an unformed rivet. Each rivet gun consists of a coil, a driver, and a recoil mass. The major difference is that the capacitor bank voltage used with an LVEMR is 500 VDC or less. Further, rivets are upset over a substantially longer period of time—one millisecond. The slower rise time is the result of a reduction in the natural electrical and mechanical frequency of the power supply, cable, coil, and driver system. The use of LVEMRs, as opposed to HVEMRs, substantially reduces rivet head cracking. For a more detailed description of LVEMRs, attention is directed to U.S. Pat. Nos. 4,862,043 ('043 patent) and 4,990,805 ('805 patent) by Peter B. Zieve, both titled Low Voltage Electro-Magnetic Pulse Actuator.

While LVEMRs of the type described in the '043 and '805 patents have advantages when compared to HVEMRs; they also have a number of disadvantages. Like HVEMRs, LVEMRs of the type described in the '043 and '805 patents employ eddy currents to generate the repulsive force required to upset a rivet. More specifically, like HVEMRs described above, when a current pulse is applied to the coil of an LVEMR of the type described in the '043 and '805 patent, an eddy current is induced in a conductive driver plate. The interaction between the magnetic field created by the current flow through the coil and the magnetic field created by the eddy currents produces a net repulsive force. Unfortunately, the finite conductivity of the driver plate limits efficiency by creating resistive power losses. In addition, the diffusion time of the magnetic field pulse through the copper driver plate limits maximum pulse duration. As a result, the efficiency of eddy current based LVEMRs is limited to a theoretical maximum of approximately 33%.

In addition to eddy current based inefficiencies, LVEMRs of the type described in the '043 and '805 patents are inefficient for other reasons. LVEMRs use large capacitor banks to store the energy dissipated during the riveting process. The following equation describes the energy stored by a capacitor bank and delivered to a rivet gun:

$$E = \tfrac{1}{2} \times C \times V^2 \tag{1}$$

where:
  E=the energy stored in the capacitor bank;
  C=the capacitance of the capacitor bank; and
  V=the capacitor bank voltage The capacitor bank voltage determines the magnitude of the rivet upset force, and the capacitance determines the length of the force duration. Because the capacitor banks incorporated in an LVEMR of the type described in the '043 and '805 is fixed, the voltage, the rivet upset force and the duration of the force are inseparable. This has a number of disadvantages. First, the period of time during which rivet upset force is applied cannot be varied to create a better interference fit. Second, the range of gun sizes operated by a single controller is limited. Invariable capacitance also restricts the range of material types and sizes that may be riveted. These disadvantages require that a specially designed LVEMR be provided for each limited range gun size and material type and size, or that undesirable compromises be made. Invariable capacitance also limits capacitor life by not allowing charges to be distributed among a large number of capacitors that can be varied from time to time and can diminish coil life due to the application of excess voltage to the coils of LVEMR guns.

As noted above, conventional LVEMR systems use a power pulse of less than 500 Volts DC, usually up to 450 Volts DC. To maintain safety, the high-voltage portion of an LVEMR must remain electrically isolated during normal operation. This is usually accomplished by allowing the high-voltage portion of an LVEMR to float with respect to ground. However, if one point of a floating power supply becomes grounded, and another point is contacted by a grounded person, the person may receive a shock. Alternatively, if the other point is grounded via some element, a spark may occur, which could lead to equipment damage. Previously developed LVEMR use an electromechanically actuated circuit breaker to address this danger. This device, sometimes called a shunt-trip breaker, is unsatisfactory for a variety of reasons. It is subject to mechanical wear, possibly resulting in mechanical failure. Electrical failure due to actuator coil burn-out is also possible. Response time and sensitivity are poor. In this regard, the total response time of such ground fault detectors incorporated in previously developed LVEMRs is on the order of 20 milliseconds from fault to shutdown. In this time, an LVEMR can attain hazardous voltages. Further, the sensitivity of such systems is in the 20 milliampere range, sufficient to deliver a painful shock through the hands of an average person.

As described above, during normal operation, when the guns of an LVEMR are energized, a rivet is squeezed from both directions. A time delay between gun energization and, thus, between the application of force to the ends of a rivet help to optimize the rivet upset process. Techniques used in previously developed LVEMR to generate such a delay, however, have limited range and resolution. More specifically, previously developed LVEMR controllers use a Programmable Unijunction Transistor (PUT) analog circuit to generate delayed gun fire signals. The resolution of analog-based delay circuits is dependent on the number of circuit elements, such as resistors and capacitors, that can be switched in and out of the circuit. The resolution time of such circuits is unsatisfactory in many riveting applications. Furthermore, such circuits do not normally allow remote control of the time delay.

The charging systems of previously developed LVEMRs also have many limitations. The charging system commonly used in previously developed LVEMRs includes a voltage doubler circuit having both voltage stability and noise production problems. The voltage doubler output is fed to a capacitor bank through a TRIAC optocoupler. The common failure mode of a TRIAC optocoupler is full on. As a result, a runaway charge condition can occur if the TRIAC optocoupler fails. Such a possibility, of course, impacts the safe operation of a LVEMR.

Another disadvantage of previously developed LVEMRs is their use of custom-designed circuit boards and subassemblies. As an example, one previously developed LVEMR controller includes Silicon Controlled Rectifier (SCR) triggering mounted on a large control circuit board that also includes other components. Such a lack of modularity makes trouble shooting and service difficult and expensive.

The present invention is directed to providing an LVEMR that overcomes the foregoing and other disadvantages of previously developed LVEMRs.

SUMMARY OF THE INVENTION

In accordance with this invention, a low-voltage electromagnetic riveter (LVEMR) is provided. The LVEMR includes a programmable control system for controlling the charging and discharging of capacitor power supplies connected to two opposed rivet guns. Each of the rivet guns includes a mass-mounted coil, a driver, and a recoil mass. Rather than including a conductive, i.e., copper, plate, the driver of each gun includes a coil. The driver coils are juxtaposed against the mass-mounted coil. The mass-mounted coil and the driver coil of each gun are wound and connected to their related capacitor power supply such that when the power supply is discharged current flows through both coils so as to create a repulsive force that moves the driver away from the mass-mounted coil, against the end of a rivet to be upset. Both rivet guns are substantially simultaneously energized to create heads on both ends of a rivet. More specifically, the resulting repulsive magnetic force produced by each gun propels a rivet die against an aligned end of a rivet, upsetting the rivet.

In accordance with other aspects of this invention, the capacitor power supplies are controllable. More specifically, the capacitor power supplies include a plurality of capacitors and a switching system for controlling the number of capacitors to be charged. As a result, the amount of power supplied to the rivet guns during discharge is controllable independent of the voltage setpoint, which is not the case with previously developed LVEMRs.

In accordance with further aspects of this invention, the programmable control system includes a ground fault detection system that includes a solid state relay having low ground current sensitivity and rapid response time. When a grounded fault is detected, the solid state relay rapidly deactivates a power control relay that terminates the application of power to the LVEMR.

In accordance with yet other aspects of this invention, the programmable control system includes a controllable delay generator that controls the discharging of the two capacitor power supplies such that one rivet gun is energized slightly before the other rivet gun.

In accordance with yet still further aspects of this invention, the shapes of the facing surfaces of the driver and mass-mounted coils are contoured to assist in maintaining alignment.

In accordance with yet still other aspects of this invention, the programmable control system includes a temperature transducer for sensing the temperature of the rivet guns and using the temperature information to control the operation of the capacitor power supplies in a manner that compensates for the change in coil resistivity that occurs with temperature changes.

In accordance with yet other further aspects of this invention, the programmable control system includes voltage transducers for sensing the voltage of the capacitor power supplies and using the sensed voltage information to prevent discharge of the power supplies if the voltage is below a predetermined rivet gun firing voltage.

In accordance with yet further other aspects of this invention, the programmable control system is modularized using off-the-shelf subsystems to the extent practicable in order to improve serviceability and reliability.

As will be readily appreciated from the foregoing summary, the invention provides a new and improved LVEMR ideally suited for upsetting rivets during the assembly of various types of workpieces. The inclusion of a driver coil in the rivet guns of the LVEMR, as opposed to a conductive driver plate, significantly enhances efficiency and optimization when generating the magnetic force required for rivet upset. Because the facing surfaces of the coils are contoured to maintain alignment, the force required for rivet upset is better directed. Because the energy to be stored in the capacitive power supplies of the LVEMR can be controlled independent of voltage setpoint, improved performance is achieved. Improved performance is achieved because controlling the amount of energy to be stored allows the rivet upset force to be varied over time. Time-varying the rivet upset force provides better control of cracking, deformation flow lines, and radial interference. The inclusion of a controllable time delay generator substantially improves delay resolution while, at the same time, enhancing firing repeatability. Furthermore, the safety, reliability, and response time of a ground fault detection circuit that includes a solid state relay is significantly better than existing ground fault detection circuits that employ mechanical relays. Because the LVEMR programmable control system is modular and assembled from standard commercial parts, the cost and service problems associated with custom-designed controllers and sub-assemblies of previously developed LVEMRs are avoided. In this regard, preferably, the modular design of the LVEMR programmable control system incorporates a commercial capacitor charging power supply with a Pulse Width Modulation switching configuration in order to provide finer charge resolution, easier troubleshooting, more noise-free operation and enhanced reliability. The inclusion of commercial power supplies also provides an increased level of safety since such power supplies include output transistors that shut down upon failure.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is schematic diagram of an alternative embodiment of a capacitor bank suitable for use in the LVEMR illustrated in FIG. 1;

FIG. 10 is a front view of the mass-mounted coil of the LVEMR rivet gun shown in FIG. 7;

FIG. 11 is a rear view of the mass-mounted coil of the LVEMR rivet gun shown in FIG. 7;

FIG. 12 is a front view of the driver coil of the LVEMR rivet gun shown in FIG. 7;

FIG. 13 is a rear view of the driver coil of the LVEMR rivet gun shown in FIG. 7.

DETAILED DESCRIPTION OF THE PREFERRED EMBODIMENT

Figure 1:
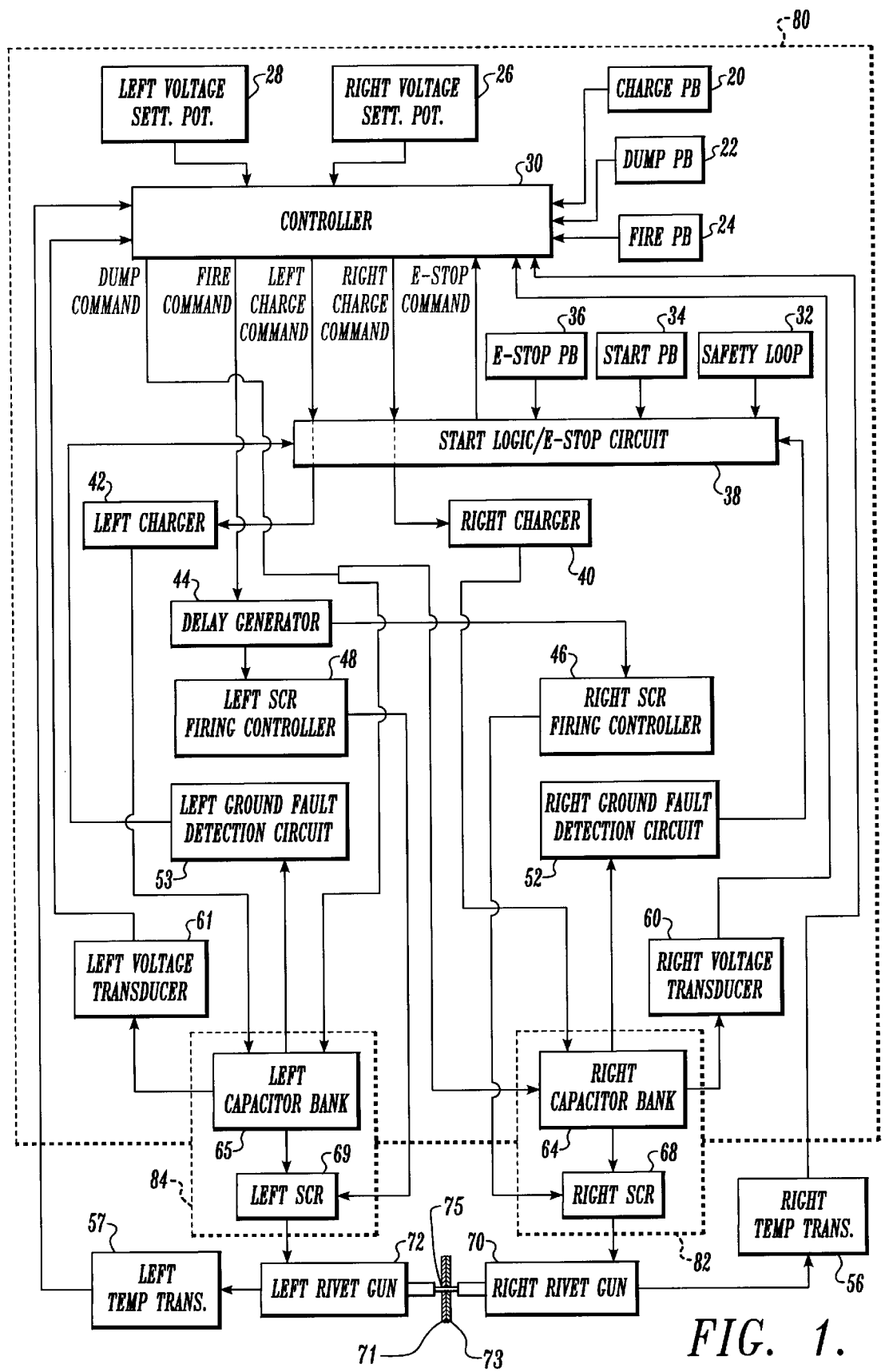
FIG. 1 is a block diagram of an LVEMR formed in accordance with this invention.

FIG. 1 is a block diagram of an LVEMR formed in accordance with this invention. The illustrated LVEMR includes right and left rivet guns 70 and 72; right and left capacitor power supplies 82 and 84 and a programmable control system 80. Also, illustrated are two workpieces 71 and 73 to be joined by a rivet 75 that is positioned in aligned holes in the workpiece.

As will be better understood from the following description, the programmable control system 80 receives information from a variety of sources including temperature transducers associated with the right and left rivet guns 70 and 72 and voltage transducers associated with the right and left capacitor power supplies 82 and 84 and a variety of pushbuttons, voltage control potentiometers, and safety checking mechanisms. Based upon the information it receives, the programmable control system 80 controls the operation of the right and left capacitor power supplies 82 and 84 which, in turn, control the operation of the right and left rivet guns 70 and 72. The rivet guns are positioned on each end of the rivet 75 shown as inserted into the two workpieces 71 and 73 to be joined together. Heads are formed when the rivet is upset by the rivet guns 70 and 72 applying suitable, substantially simultaneous, forces to the ends of the rivet. More specifically, the programmable control system 80 includes a time delay that controls the application of power supplied by the right and left power supplies 82 and 84 to the right and left rivet guns 70 and 72 so that the rivet upset forces applied to the ends of the rivet are not exactly simultaneous. Rather, the time delay causes one rivet gun to apply an upset force to one end of the rivet slightly before the other rivet gun supplies an upset force to the other end of the rivet.

As hereinafter described in more detail, each rivet gun includes mass-mounted and driver coils that simultaneously receive power from their respective capacitor power supplies. When energized, the mass-mounted and driver coils produce a net magnetic repulsive force that is used to upset the rivet. As also hereinafter described in more detail, the right and left capacitor power supplies each include a switching system that allows a controllable configuration of capacitors to be changed. Further, the programmable control system includes a ground fault detection system that minimizes the electrical shock hazard to personnel operating the LVEMR.

The programmable control system 80 shown in FIG. 1 comprises: right and left voltage setting potentiometers 26 and 28; a controller 30; a charge pushbutton switch 20; a dump pushbutton switch 22; a fire pushbutton switch 24; an emergency stop (E-stop) pushbutton switch 36; a start pushbutton switch 34; a safety loop 32; a start logic/E-stop circuit 38; right and left chargers 40 and 42; a delay generator 44; right and left SCR firing controllers 46 and 48; right and left ground fault detection circuits 52 and 53; right and left temperature transducers 56 and 57; and right and left voltage transducers 60 and 61. In order to avoid a capacitor explosion if the programmable control system fails, the outputs of the right and left chargers 40 and 42 are limited to a maximum output value, such as 450 volts, for example.

The right and left capacitor power supplies 82 and 84 each include a capacitor bank 64 and 65 and an SCR circuit 68 and 69. As will be better understood from the following description, when enabled, the right and left SCR circuits 68 and 69 control the application of the charge stored in the right and left capacitor banks 64 and 65 to the right and left rivet guns 70 and 72, respectively.

Returning to the programmable control system 80, the controller 30 is, preferably, a programmable logic controller (PLC) that functions in the manner illustrated in FIGS. 14A–14C and described below. While various programmable logic controllers can be utilized, in one actual embodiment of the invention, the SLC 500 manufactured by the Allen Bradley Company, Milwaukee, Wis., is used.

As illustrated in FIG. 1 and described next, the controller 30 receives a plurality of input signals and produces a plurality of output signals. More specifically, the charge, dump, and fire pushbutton switches 20, 22, and 24 are connected to the controller. When the pushbuttons of any of these switches are depressed, the depression is sensed by the controller, which causes suitable action to take place. For example, when the pushbutton of the charge pushbutton switch is depressed, the right and left capacitor banks 64 and 65 are charged in the manner described below. When the pushbutton of the dump pushbutton switch is depressed, the charge on the right and left capacitor bank is dumped, i.e., the capacitor banks are discharged. When the pushbutton of the fire pushbutton switch is depressed, the charge capacitor banks are discharged in a manner that causes the right and left rivet guns to upset a rivet.

The right and left voltage-setting potentiometers 26 and 28 are also connected to the controller 30. The controller senses the setting of the right and left voltage-setting potentiometers and, in accordance therewith, controls the voltage magnitude of the charge stored in the right and left capacitor banks, respectively.

The right and left temperature transducers 56 and 57 sense the temperature of the right and left rivet guns 70 and 72 and produce analog signals related thereto that are applied to the controller 30. Likewise, the right and left voltage transducers 60 and 61 sense the voltage stored in the right and left capacitor banks 64 and 65 and produce related analog signals that are applied to the controller 30. As described more fully below with respect to FIGS. 14A–14C, the controller uses the temperature signals to compensate for resistance changes in the coils of the rivet guns and the voltage signals to determine when the capacitors are charged to the level set by the voltage-setting potentiometers, compensated for coil resistance changes.

The controller 30 produces a plurality of command signals, some of which pass through the start logic/E-stop circuit 38. The start logic/E-stop circuit has the capability of interrupting the command signals in the manner described below. More specifically, the controller produces a left charge command, a right charge command, a fire command, and a dump command. The right and left charge commands are applied (through the start logic/E-stop circuit) to the right and left chargers 40 and 42, respectively, to cause the right and left chargers to supply a charge voltage to the right and left capacitor banks, respectively. While various types of chargers can be utilized, in one actual embodiment of the invention, the chosen charger was the model ALE #102-450-FL, manufactured by ALE Corporation, Neptune, N.J.

The fire command signal produced by the controller is applied to the delay generator 44. The delay generator produces two output commands, one applied to the right SCR firing controller 46 and the other applied to the left SCR firing controller 48. The only difference between the commands produced by the delay generator is that one command is slightly delayed from the other output command. While various types of delay generators can be utilized, in one actual embodiment of the invention, the chosen delay generator was the model CAL-AV#101AR with W1 and V0 options, manufactured by California Avionics, Campbell, Calif. Likewise, while various types of SCR firing controllers can be utilized, in one actual embodiment of the invention, the chosen SCR firing controllers were the model FCOREM60 manufactured by Enerpro, Goleta, Calif. The right and left SCR firing controllers produce fire commands that are applied to the right and left SCR circuits 68 and 69, respectively.

The dump command signal produced by the controller 30 is applied to the right and left capacitor banks 64 and 65. As noted above, when a dump signal is produced, the charge on the right and left capacitor banks is dumped, i.e., the capacitor banks are discharged.

As will be better understood from the following description, the amount of power stored in the right and left capacitor banks is controllable. More specifically, each capacitor bank includes a switching system and a plurality of capacitors. The switching system selectively connects the capacitors to the right and left chargers. The capacitors connected to the chargers, of course, charge. All of the charged capacitors are discharged simultaneously, either to the right and left rivet guns 70 and 72 when a fire command occurs, or to ground when a dump command occurs.

The start logic/E-stop circuit 38 receives a plurality of inputs. More specifically, the start logic/E-stop circuit 38 is connected to the safety loop 32, the start pushbutton switch 34, and the E-stop pushbutton switch 36. In addition, the start logic/E-stop circuit is connected to the right and left ground fault detection circuits 52 and 53. Assuming that no ground faults exist and that the safety loop is completed, when the pushbutton of the start pushbutton switch is depressed, the start logic/F-stop circuit allows charge commands produced by the controller to enable the right and left chargers 40 and 42. If the pushbutton of the emergency stop pushbutton switch 38 is depressed, the start logic/E-stop circuit immediately disables the right and left chargers 40 and 42. In addition, an emergency stop signal is supplied to the controller 30 that causes the controller 30 to dump the charge on the right and left capacitor banks 64 and 65. Likewise, if the safety loop 32 is interrupted, or either of the ground fault detection circuits detects a ground fault, the start logic/E-stop circuit immediately disables the right and left chargers 40 and 42 and causes the controller to dump the charge on the right and left capacitor banks 64 and 65.

Figure 2:
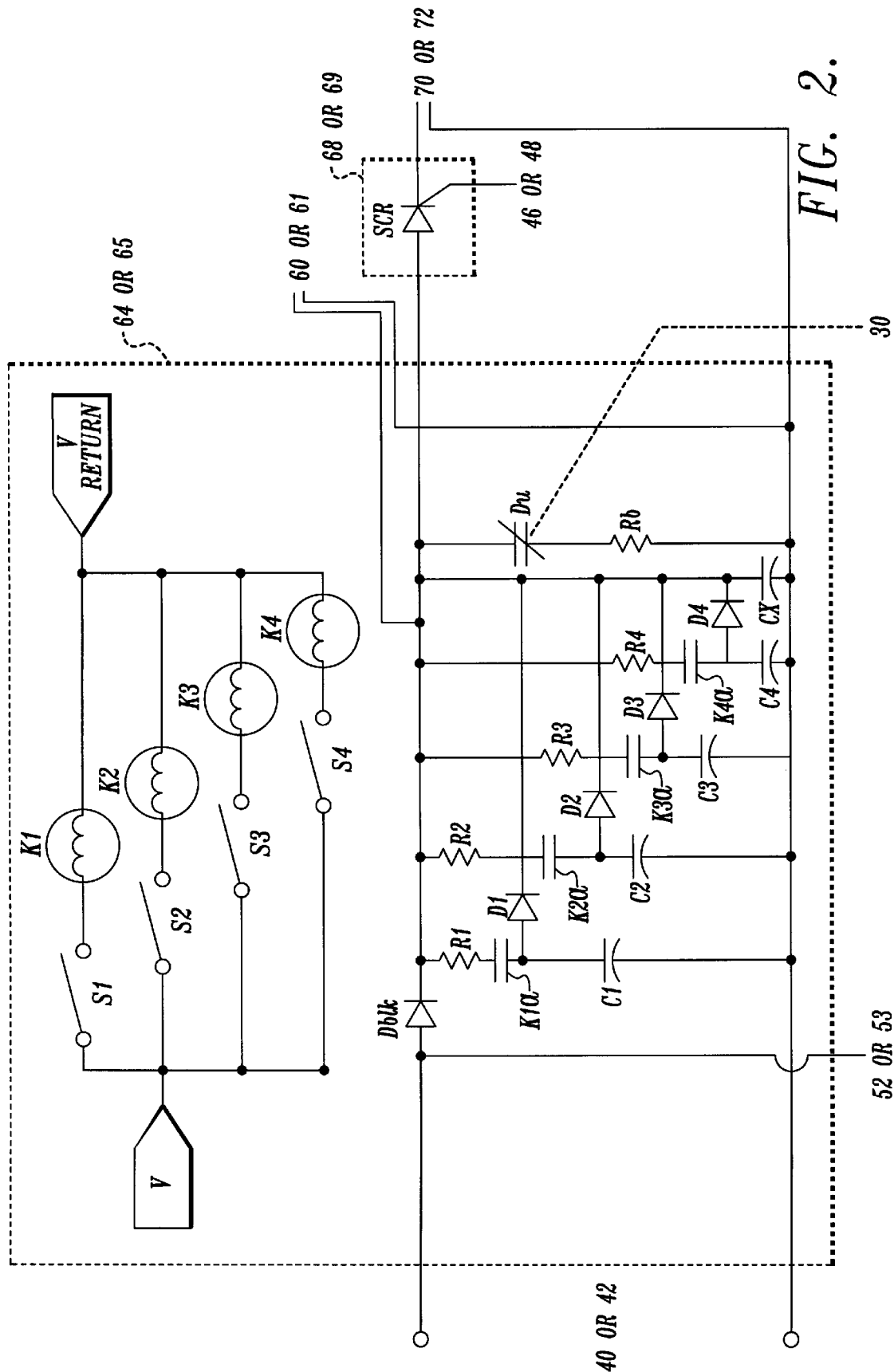
FIG. 2 is a schematic diagram of a capacitor bank suitable for use in the LVEMR illustrated in FIG. 1.

As noted above, both the right and left capacitor banks 64 and 65 include a plurality of capacitors and a switching system that allows the capacitors to be selectively connected to the right and left chargers 40 and 42, respectively. As a result, the number of capacitors that can be charged is controllable. Because the number of capacitors that can be charged is controllable, the power stored in the right and left capacitor banks is controllable. Since the amount of electric power stored in the right and left capacitor banks 64 and 65 is controllable, as well as the magnitude of the voltage of the stored power, the voltage magnitude of the power and amount of power applied to the right and left rivet guns 70 and 72 is independently controllable. FIG. 2 is a schematic diagram illustrating one of the capacitor power supplies formed in accordance with the invention. FIG. 4 is an alternative embodiment of a capacitor power supply formed in accordance with the invention.

FIG. 2 includes a capacitor bank 64 or 65 and an SCR circuit 68 or 69. The capacitor bank 64 or 65 comprises: a blocking diode designated Dblk; a dump resistor designated Rb; a dump contact designated Du; a main energy storage capacitor designated CX; four auxiliary capacitors designated C1, C2, C3, and C4; four capacitor cut-in switches designated S1, S2, S3, and S4; four capacitor cut-in relays designated K1, K2, K3, and K4; four isolating diodes designated D1, D2, D3, and D4; four internal resistances, designated R1, R2, R3 and R4; and four capacitor cut-in relay contacts designated K1a, K2a, K3a, and K4a. R1, R2, R3 and R4 represent the inherent wire and contact resistance of K1a, K2a, K3a and K4a. CX, C1, C2, C3, and C4 are standard design high-power electrolytic capacitors having a voltage capacity large enough to handle the maximum output voltage produced by the related charger 40 or 42, 450 volts in the example set forth above.

The capacitor bank 64 or 65 is connected to the positive voltage output of the related charger 40 or 42 through Dblk. C1 is connected in series with K1a and R1 in that order. C2 is connected in series with K2a and R2 in that order. C3 is connected in series with K3a and R3 in that order. C4 is connected in series with K4a and R4 in that order. Each of these series connections, as well as CX, are connected in parallel. The other ends of R1, R2, R3 and R4 and one end of CX are connected to the cathode of Dblk. The anode of Dblk is connected to the high-voltage, e.g., positive, output of the related charger 40 or 42. The other ends of C1, C2, C3, C4 and CX are connected to the low-voltage, e.g., negative, output of the related charger 40 or 42. The outputs of the chargers are floating with respect to ground.

The junctions between K1a, K2a, K3a, and K4a and C1, C2, C3, and C4, respectively, are connected through D1, D2, D3, and D4, respectively, to the positive voltage side of CX. Rb is connected in series with Du and the series connection is connected in parallel with CX so that the one side of Du is connected to the positive voltage side of CX. Du are the contacts of a dump relay (not shown) operated by the controller 30 in the manner described below.

S1 is connected in series with K1, S2 is connected in series with K2, S3 is connected in series with K3, and S4 is connected in series with K4. These series circuits are connected in parallel with one another between a voltage source designated and a voltage return designated Vreturn. In one actual embodiment of the invention V equaled 24 volts DC.

K1, K2, K3, and K4 control the status of K1a, K2a, K3a, and K4a, respectively. More specifically, when S1 is closed, K1 is energized and K1a is closed. Likewise, when S2, S3 and S4 are closed, K2a, K3a, and K4a are closed due to the energization of K2, K3, and K4. As a result, the state of S1, S2, S3, and S4 determine whether C1, C2, C3, or C4 are in or out of the capacitor bank circuit. Because the circuit capacitance of the capacitor banks is controllable, the power storage capability of the capacitor banks is controllable.

In one actual embodiment of the invention, capacitor bank circuit capacitance varies in a range from 0.0288 farads up to 0.0576 farads in steps of 7200 microfarads. Obviously, as will be appreciated by those skilled in this art and others, the capacitance of each capacitor may be chosen differently to achieve other incremental values. Moreover, additional or fewer auxiliary capacitors may be used.

The capacitor banks 64 and 65 are enabled to be charged when Du is opened by the energization of a dump relay coil (not shown) operated by the controller 30. Energization of the dump relay opens normally closed contacts Du to prevent the discharge of electrical energy through Rb. Dblk is included to insure that current from the charger 40 or 42 flows into the capacitor bank 64 or 65. D1, D2, D3, and D4 serve to isolate C1, C2, C3, and C4, respectively, from CX.

The SCR circuit 68 or 69 is shown as formed by a single high-power silicon controlled rectifier (i.e., a single SCR). In any event, the positive output side of the capacitor bank 64 or 65 is connected to the anode of the SCR. The gate of the SCR is connected to the output of the related SCR firing controller 46 or 48, and the cathode of the SCR is connected to the mass-mounted and driver coils of the related rivet gun 70 or 72 in the manner described below.

The input of the related voltage transducer 60 or 61 is connected across the output of the capacitor bank. The input of the related ground fault detection circuit 52 or 53 is connected to the positive voltage input of the capacitor bank.

Figure 3:
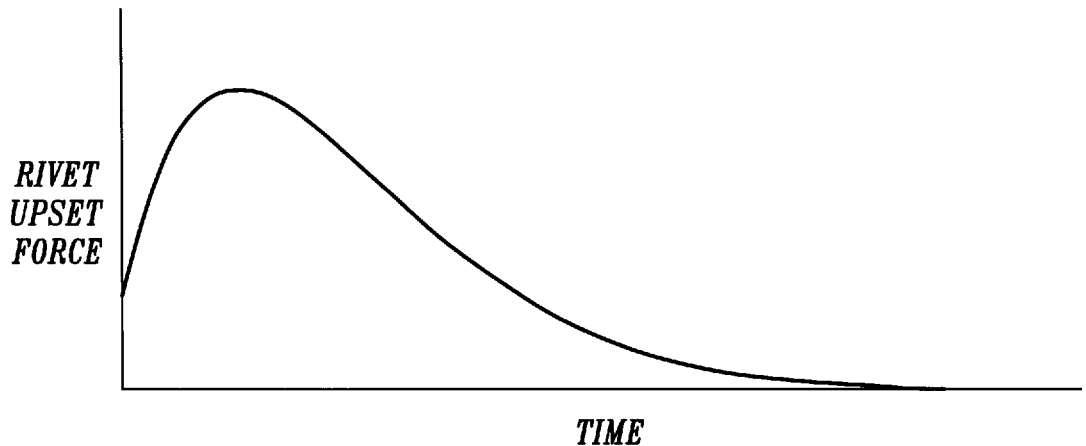
FIG. 3 is a waveform of the current pulse produced by the capacitor bank, illustrated in FIG. 2.

FIG. 3 illustrates the knee-shaped current pulse waveform generated by a capacitance bank of the type shown in FIG. 2, and thus the force produced by a rivet gun energized by such a capacitor bank. Initially the rivet upset force is relatively small. As time passes, the upset force pulse exponentially rises to a peak value and then decreases exponentially to zero.

FIG. 4 illustrates an alternative embodiment of a capacitor bank 64' or 65' and SCR circuit 68' or 69' formed in accordance with the invention. A prime has been added to the reference numbers identifying the capacitor bank and the SCR circuit in order to distinguish FIG. 4 from FIG. 2.

The capacitor bank 64' or 65' illustrated in FIG. 4 comprises: five diodes designated Di1, Di2, Di3, Di4, and Di5; five switches designated Sw1, Sw2, Sw3, Sw4, and Sw5; five capacitors designated Ca1, Ca2, Ca3, Ca4, and Ca5; five dump resistors designated RD1, RD2, RD3, RD4, and RD5; and five dump contacts designated KD1, KD2, KD3, KD4, and KD5. The positive voltage output of the right charger 40 is connected to the anodes of Di1, Di2, Di3, Di4, and Di5. The cathodes of Di1, Di2, Di3, Di4, and Di5 are connected to Ca1, Ca2, Ca3, Ca4, and Ca5, respectively, through Sw1, Sw2, Sw3, Sw4, and Sw5, respectively. The open/closed states of Sw1, Sw2, Sw3, Sw4, or Sw5 determine if Ca1, Ca2, Ca3, Ca4, or Ca5 are or are not to be charged. In addition to controlling charging per se, the voltage magnitude of the charges on Ca1, Ca2, Ca3, Ca4, and Ca5 may be varied by opening Sw1, Sw2, Sw3, Sw4, and Sw5, respectively, during a charging cycle. When this process is used, open switch capacitors are charged to a relatively lower voltage at the end of a charging cycle. Other methods for accomplishing variable voltage charges on the capacitors may, of course, be used. For example, each capacitor could be charged by a separate voltage source or by a different voltage output of a common source.

RD1 is connected in series with KD1; RD2 is connected in series with KD2; RD3 is connected in series with KD3; RD4 is connected in series with KD4; and RD5 is connected in series with KD5. The series connections are connected in parallel with Ca1, Ca2, Ca3, Ca4 and Ca5, respectively. KD1, KD2, KD3, KD4, and KD5 are normally closed. As with Du (FIG. 2) KD1, KD2, KD3, KD4, and KD5 are dump relay contacts that are operated by a dump relay coil (not shown) controlled by the controller 30. In the absence of a dump command, the dump relay is energized, opening KD1 through KD5. When a dump command occurs, the dump relay is deenergized, allowing KD1 through KD5 to close.

The junctions between Sw1, Sw2, Sw3, Sw4, and Sw5 and Ca1, Ca2, Ca3, Ca4, and Ca5, respectively, are connected to the related SCR circuit 68' or 69'. More specifically, the SCR circuit comprises five high-power silicon controlled rectifiers designated SCR1, SCR2, SCR3, SCR4, and SCR5. The anodes of SCR1, SCR2, SCR3, SCR4, and SCR5 are connected to the junctions between Sw1, Sw2, Sw3, Sw4, and Sw5 and Ca1, Ca2, Ca3, Ca4, and Ca5, respectively, of the related capacitor bank 64' or 65'. The gates of SCR1, SCR2, SCR3, SCR4, and SCR5 are connected to the related SCR firing controller 46 or 48. In the case of the capacitor bank/SCR circuit version of the invention shown in FIG. 3, the related SCR firing controller has five outputs that may include pulse transformer interfaces. The cathodes of SCR1, SCR2, SCR3, SCR4, and SCR5 are connected together and to both coils of the related rivet gun 70 or 72 in the manner described below.

Figure 5:
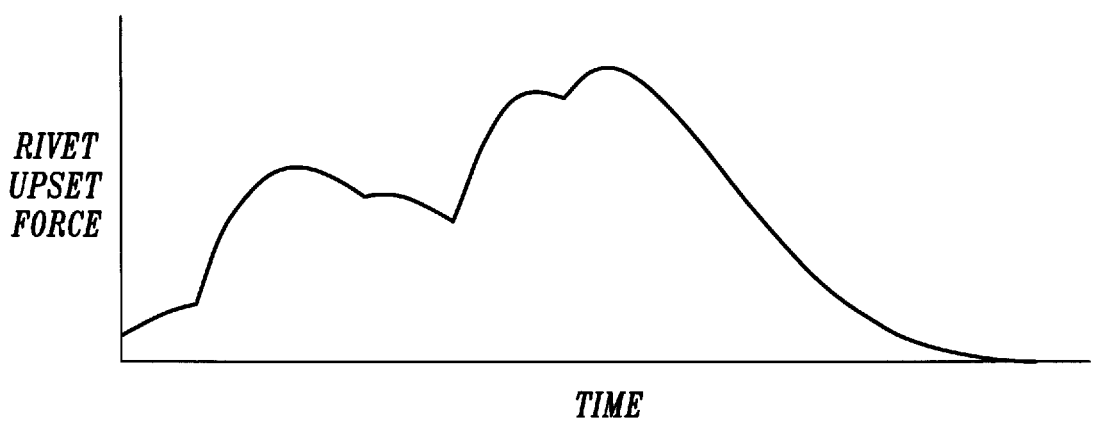
FIG. 5 is a waveform of the current pulse produced by the capacitor bank illustrated in FIG. 4.

When one of the SCR firing controllers 46 or 48 receives a fire command signal, trigger pulses are sent to SCR1, SCR2, SCR3, SCR4, and SCR5 of the related SCR circuit 68' or 69' in a preprogrammed order. When SCR1, SCR2, SCR3, SCR4, and SCR5 receive trigger pulses, they conduct current from Ca1, Ca2, Ca3, Ca4, and Ca5, respectively, to the rivet gun coils. The timing of the trigger pulses, as well as any voltage differences among Ca1, CA2, Ca3, Ca4, and Ca5, combine to create a variable current pulse. FIG. 5 is an example of a multi-knee waveform representative of the type of variable current pulse, and thus the rivet upset force, that might be generated by a capacitor power supply of the type shown in FIG. 4.

Figure 6:
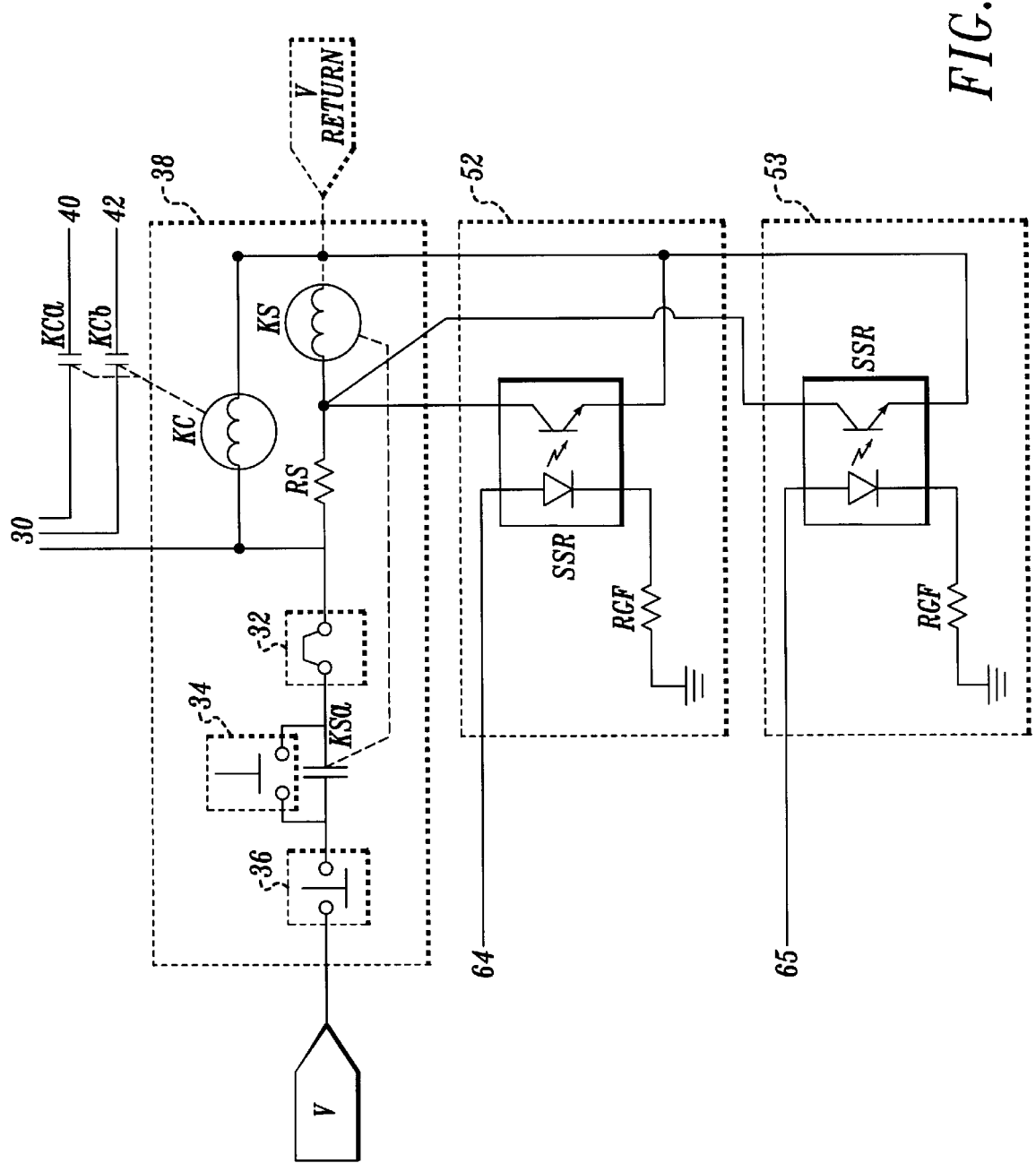
FIG. 6 is a schematic diagram of right and left ground fault detection circuits and a start logic/E-stop circuit suitable for use in the LVEMR, illustrated in FIG. 1.

FIG. 6 illustrates a start logic/E-stop circuit 38 and right and left ground fault detection circuits 52 and 53 suitable for use in the LVEMR shown in FIG. 1. Also shown in FIG. 6 are the E-stop pushbutton switch 36; the start pushbutton switch 34; and the safety loop 32. The start logic/E-stop circuit includes: a resistor designated RS; a latch relay coil designated KS; normally open latch relay contacts designated KSa; a charger control relay coil designated KC and a pair of normally open charger control relay contacts designated KCa and KCb. The E-stop pushbutton switch 36 is normally closed, and the start pushbutton switch is normally open. One terminal of the E-stop pushbutton switch 36 is connected to one terminal of the start pushbutton 34 switch and the other terminal of the E-stop pushbutton switch is connected to the voltage source, V. KSa is connected in parallel with the terminals of the start pushbutton switch 34. The other terminal of the start pushbutton switch is connected to one side of the safety loop 32. The other side of the safety loop is connected through RS to one end of KS. The other end of KS is connected to the voltage return, i.e., to Vreturn. KC, which controls the state of KCa and KCb, is connected in parallel with the series circuit formed by RS and KS. The state of KCa and KCb controls the enablement/disablement of the right and left chargers 40 and 42, respectively.

The LVEMR is started by depressing the button of the start pushbutton switch 34. If the safety loop is closed and the E-stop pushbutton switch is closed, current flows through KS and KC. The energization of KS closes KSa, resulting in the flow of current through KS and KC being maintained. Energizing KC closes KCa and KCb, enabling the right and left chargers 40 and 42. As a result, the chargers are ready to charge the right and left capacitor banks 64 and 65, or 64' and 65'. As will be better understood from the following description of FIGS. 14A–14C, charging does not actually begin until the pushbutton of the charge pushbutton switch 20 is depressed.

The voltage at the junction between the safety loop 32 and RS is fed back to the controller 30. If an emergency stop is required during the charging process, depression of the pushbutton of the E-stop pushbutton switch 36 ends the flow of current through KC and KS, thereby deenergizing KC and KS. As a result, KSa will open, maintaining current flow stopped after the button of the E-stop pushbutton switch is released. Deenergization of KC opens KCa and KCb, disabling the right and left chargers. Further, as will be better understood from the following description of the overall operation of the LVEMR depicted in FIGS. 14A–14C, the drop in voltage at the junction between the safety loop 32 and RS causes the controller 30 to issue a dump command that discharges the right and left capacitor banks.

Like the depression of the button of the E-stop pushbutton switch 36, a failure of the safety loop will terminate the flow of current through KS and KC, causing the same sequence of events.

The ground fault detection circuits 52 and 53 each comprise: a solid state relay in the form of an electro-optical coupler designated SSR; and a resistor designated RGF. Preferably, the sensitivity of the SSR is five milliamperes. The SSR includes a photodiode and an optically activated transistor. The anode of the photodiode of the SSR is connected to the positive side of the related capacitor bank 64 or 65 as shown in FIGS. 2 and 4. The cathode of the photodiode is connected to ground. The collectors of the phototransistors of the SSRs are connected to the junction between RS and KS of the start logic/E-stop circuit 38. The emitters of the phototransistors of the SSRs are connected to the Vreturn side of KC and KS. Thus, the phototransistors of the SSRs both bridge KS.

Because the inputs of the capacitor banks 64 and 65 or 64' and 65' are floating, normally no current flows through the photodiodes of the SSRs. Contrariwise, if a ground fault occurs, current flows through the photodiode connected to the positive input of the capacitor bank experiencing the ground fault. When this occurs, the phototransistor related to the current conducting photodiode is turned on, shorting KS. When KS is shorted, KSa opens to disable the LVEMR. More specifically, opening KSa terminates the flow of current through KC, which, as described above, disables the chargers 40 and 42. At the same time, the drop in voltage at the junction between the safety loop 32 and RS causes the controller to discharge the capacitor banks. While the ground fault circuit resistors RGF can have various values, in one actual embodiment of the invention 15.5 kiloohms was chosen. Obviously, other values may be chosen as long as the chosen value allows the SSR to respond with sufficient speed and SSR input power is not exceeded.

Figure 7:
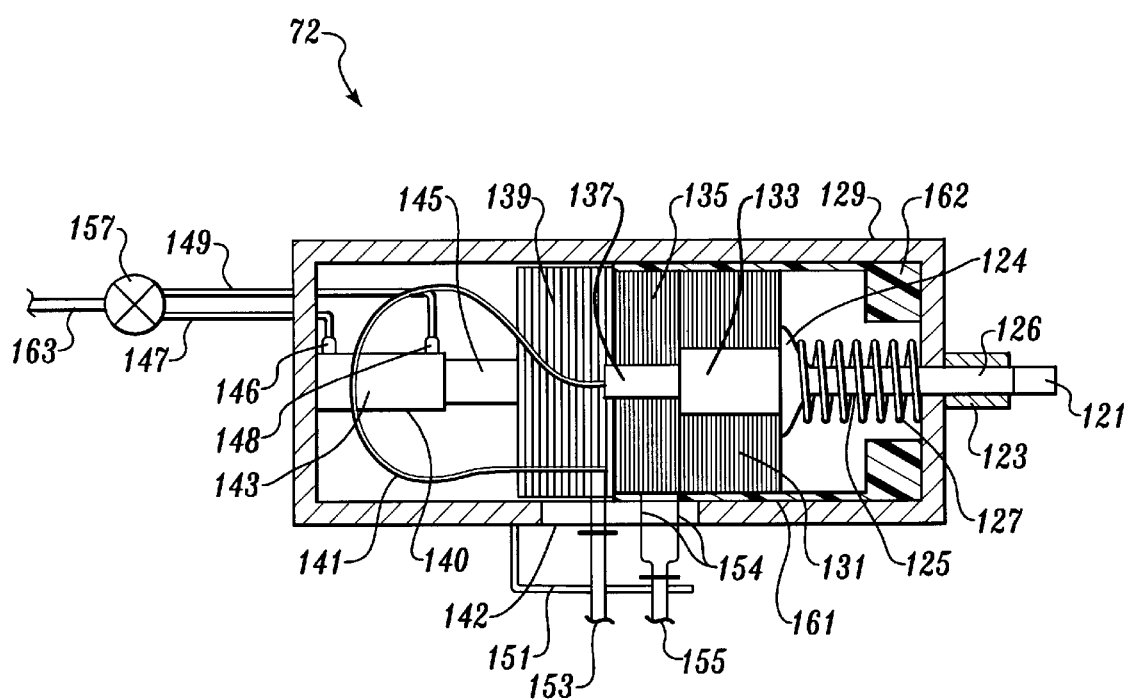
FIG. 7 is a top plan view, partially in section, of a rivet gun suitable for use in the LVEMR shown in FIG. 1.
Figure 8:
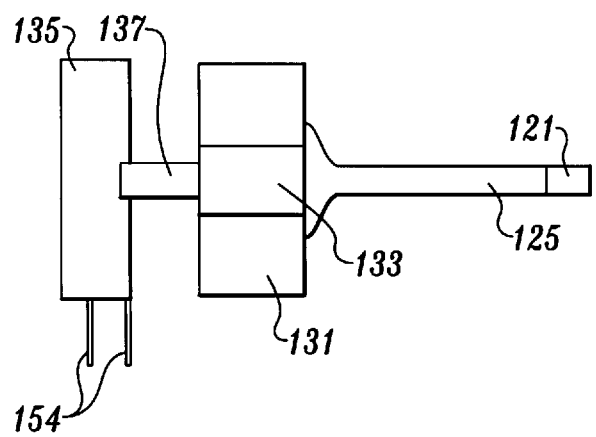
FIG. 8 is a top view of the mass-mounted coil and the driver of the LVEMR rivet gun shown in FIG. 7.
Figure 9:
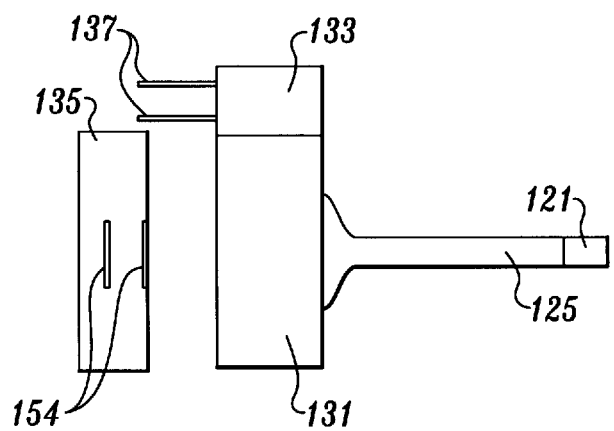
FIG. 9 is a side view of the mass-mounted coil and the driver of the LVEMR rivet gun shown in FIG. 7.

FIG. 7 is a top plan view, partially in section, of one of the rivet guns 70, 72. FIGS. 8 and 9 are simplified top and side views showing the major elements of the rivet gun; namely, a driver 125, a driver coil 131, and a mass-mounted coil 135. FIGS. 10 and 11 are front and rear views, respectively, of the mass-mounted coil 135 and FIGS. 12 and 13 are front and rear views, respectively, of the driver coil 131.

In addition to the driver 125, the driver coil 131, and the mass-mounted coil 135, the rivet gun illustrated in FIG. 7 includes: a housing 129; a rivet die 121; a driver rod bushing 123; a coil spring 127; a recoil mass 139; a pneumatic shock absorber 140; a pair of flexible cables 141; a pneumatic valve 157; and a driver coil guide bushing 161. The housing 129 provides mechanical support for the other components of the rivet gun as well as a barrier that prevents the entry of unwanted foreign material. All of the components, except for the rivet die 121, the driver rod bushing 123, and the pneumatic valve 157, are mounted in the housing. The driver rod bushing is mounted on the outer surface of one of the walls of the housing 129.

The driver 125 includes a conical base 124 and a rod 126 that is integral with and protrudes longitudinally outwardly from the tip of the conical base. The outer end of the rod passes through the driver rod bushing 123. The rivet die 121 is mounted on the outer tip of the rod 126 of the driver 125. The rivet die 121 may be attached to the rod 126 in any suitable manner. For example, the rivet die 121 may be attached to the rod 126 by screwing the die onto the end of the driver rod or by a snap fit mechanism.

Affixed to the conical base 124 of the driver 125, opposite the rod 126, is the driver coil 131. Located on the opposite side of the driver coil 131 from the driver 125 is the mass-mounted coil 135. As shown in FIGS. 10–13, the driver and mass-mounted coils 131 and 135 are generally cylindrical in shape.

The driver coil guide bushing 161 is located on the inner wall of the housing 129 and is positioned so as to surround the driver coil 131 and, preferably, the mass-mounted coil 135. The driver coil guide bushing 161 extends outwardly from the driver coil 131 to the wall of the housing that supports the driver rod bushing 123. The driver coil guide bushing 161 includes a shoulder 162 where the bushing meets the wall of the housing that supports the driver coil bushing 123. Thus, the shoulder surrounds the rod 126 of the driver 125. The coil spring 127 surrounds the rod 126 of the driver 125, and lies between the conical base 124 of the driver 125 and the wall of the housing 129 that supports the driver rod bushing 123.

The recoil mass 139 is affixed to the side of the mass-mounted coil 135 remote from the side of the mass-mounted coil that faces the driver coil 131. Preferably, the recoil mass 139 is formed of a plurality of plates, some of which can be removed to allow the magnitude of the recoil mass to be adjusted.

The pneumatic shock absorber 140 includes a cylinder 143 and a rod 145 connected to a piston (not shown) located in the cylinder 143. The pneumatic shock absorber 140 is mounted in the housing 129 such that the outer end of the rod 145 extends toward the recoil mass 139 and the remote end of the cylinder 143 impinges on and is attached to the wall of the housing 129 opposite the wall that supports the driver rod bushing 123. Preferably, the rod 145 and the cylinder 143 of the pneumatic shock absorber 140 are longitudinally aligned with the longitudinal axis of the rod 126 of the driver 125. Alternatively, a plurality of pneumatic shock absorbers can be used in place of the single pneumatic shock absorber shown in FIG. 7 in which case the longitudinal axes of the rods and cylinders of the pneumatic shock absorbers will lie parallel to one another and parallel to the longitudinal axis of the rod 126 of the driver 125.

Inlets/outlet ports 146 and 148 are located at opposite ends of the cylinder 143 of the pneumatic shock absorber 140. Conduits 147 and 149 couple the shock absorber ports 146 and 148 to the pneumatic valve 157. The pneumatic valve 157 is also connected to a pressurized air line 163. As a result of this arrangement, the position of the valve 157 can be used to control the extension and retraction of the rod 145 of the shock absorber 140. The pneumatic valve, which includes a pressure relief valve, can be used to control the amount of force applied by the pneumatic shock absorber to the recoil mass 139 and, thus, to the mass-mounted coil 135.

The driver coil guide bushing 161, including the shoulder 162, is formed of a low-friction material, preferably Teflon. While the driver rod guide bushing 123 is also formed of a low-friction material, a harder material, such as brass, is preferred. The driver rod bushing 123 and the driver coil guide bushing 161 allow the driver 125 to slide back and forth. The coil spring 127 forms a retraction spring that presses the driver coil 131 against the mass-mounted coil 135 prior to energization of the driver and mass-mounted coils in the manner described herein.

As noted above, FIGS. 10 and 11 are front and rear views, respectively, of the mass-mounted coil 135, and FIGS. 12 and 13 are front and rear views of the driver coil 131. Both coils are wound of flat copper conductors 136 embedded in an epoxy 138. The coils are exposed (except for a thin coating that prevents shorting) on their facing surfaces. Thus, the front face (FIG. 10) of the mass-mounted coil 135 is exposed as is the rear face (FIG. 13) of the driver coil 131. The other faces are enclosed by the epoxy, as seen in FIGS. 11 and 12. While the facing surfaces of the coils may be flat, preferably one surface is slightly concave and the other is slightly convex in a corresponding manner to assist in coil alignment.

As best illustrated in FIGS. 8 and 9, a block 133, preferably formed of the same material in which the coil is embedded, i.e., fiberglass epoxy reinforced resin, is located on one edge of the driver coil 131. The terminals 137 of the moving coil 131 extend outwardly from the block 133, in the direction of the mass-mounted coil 135, on one side thereof, as shown in FIG. 9.

As shown best in FIG. 7, one end of the pair of flexible cables 141 is connected to the terminals 137 of the driver coil 131. The path of the flexible cables 141 defines a relatively large loop and the other end of the flexible cables exit the housing 129 via a slot 142 formed in the side of the housing. More specifically, the slot 142 is aligned with the recoil mass 139 and the mass-mounted coil 135. Preferably, the recoil mass 139 provides support for the cables 141 in the region of the slot 142. While the flexible cables may take on a variety of forms, the presently preferred flexible cable material is known as welding cable. Because the terminals 137 of the driver coil 131 lie parallel to the direction of movement of the driver coil 133, the connection between the terminals 137 and the flexible cables 141 is in the direction of minimum strain.

The terminals 154 of the mass-mounted coil 135 extend outwardly through the slot 142 in the housing 129. Wires 153 and 155 connect the ends of the flexible cables 141 and the terminals 154 of the mass-mounted coil 135 to the related firing control SCR 68 or 69. More specifically, one wire of each coil is connected to the negative side of the related capacitor bank and the other wire is connected to the cathode of the related SCR circuit 68 and 69 or 68' and 69'. A strain relief 151 provides support for the wires where they exit the slot 142.

Turning now to a description of the operation of the rivet gun illustrated in FIGS. 7–13, when the right and left SCR circuits 68 and 69 or 68' and 69' are enabled by pulses produced by the right and left SCR firing controllers 46 and 48, the right and left capacitor bank 64 and 65 or 64' and 65' discharge the energy stored in the capacitor bank into the driver and mass-mounted coils 131 and 135 of the rivet gun. The winding of the driver and mass-mounted coils of each rivet gun is such that a repulsive magnetic force is produced. Since the recoil mass of each gun is relatively large and since it is shock absorbed on the side of the mass-mounted coil opposite the driver coil and since the driver coil is free to move (except for the small retraction force produced by the coil spring), the repulsive magnetic force causes the driver coil 131 to rapidly move away from the mass-mounted coil 135. As a result, the rivet die 121 of the rivet guns apply an upset force to the related ends of a rivet located between the rivet guns. See FIG. 1. The resulting upset force upsets the rivet, forming heads on both ends of the rivet.

The reaction force created as a result of upsetting the rivet, and the force produced by the coil spring 127, pushes the driver coil 131 back against the mass-mounted coil 135. The shock of the resulting impact is absorbed by the recoil mass 139 and the pneumatic shock absorber 140. More specifically, the recoil force causes the rod 145 of the pneumatic shock absorber to move into the cylinder 143 against the pressure stored in the cylinder on the side of the shock absorber piston remote from the rod 145. The pressure increase is relieved by the pressure release valve incorporated into the pneumatic valve 157. As a result, the shock absorber dampens the recoil shock produced by the actuation of the rivet gun.

Figure 14A:
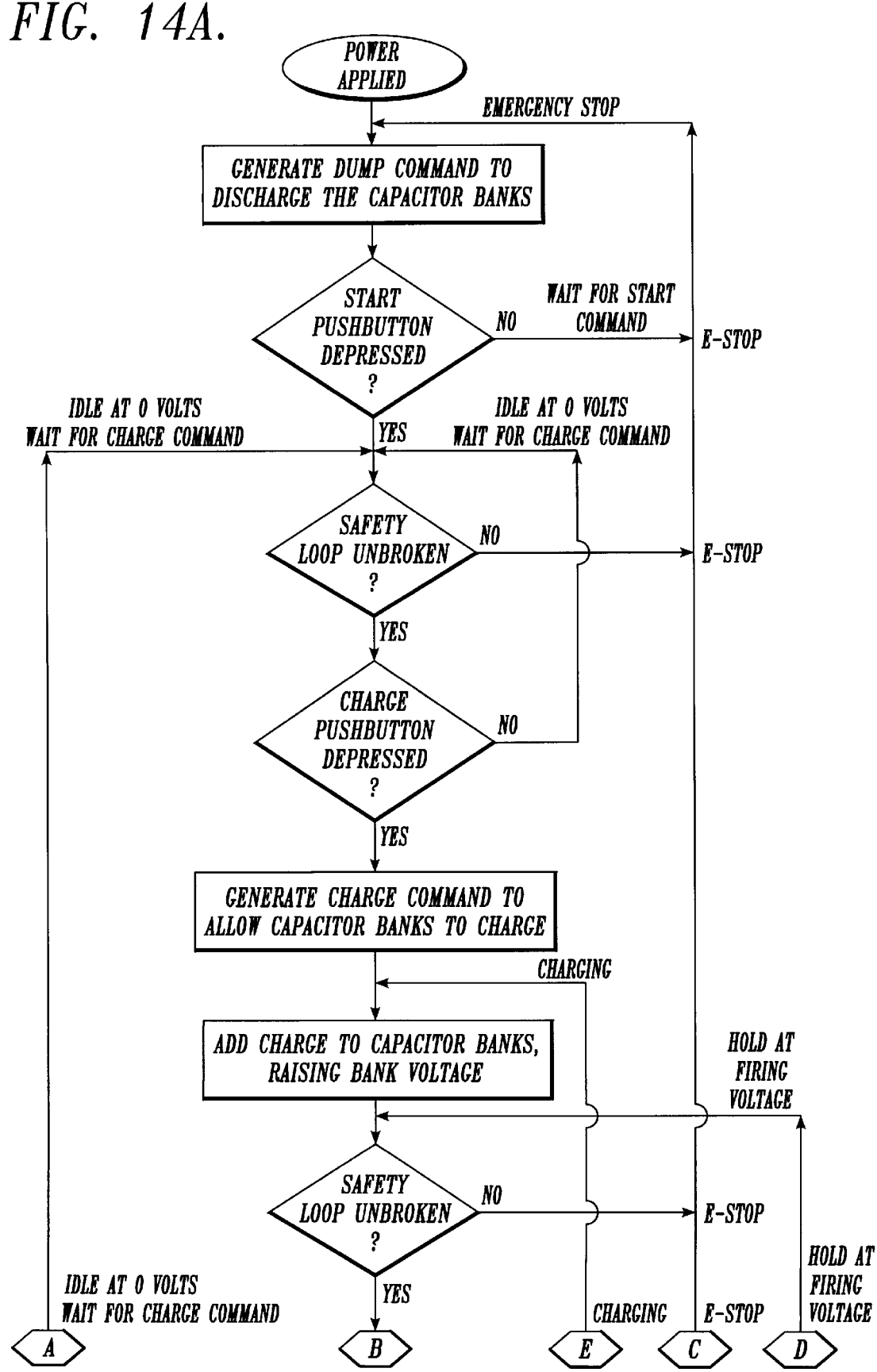
FIGS. 14A–14C form a flow diagram showing how the LVEMR illustrated in FIG. 1 is programmed to operate.
Figure 14B:
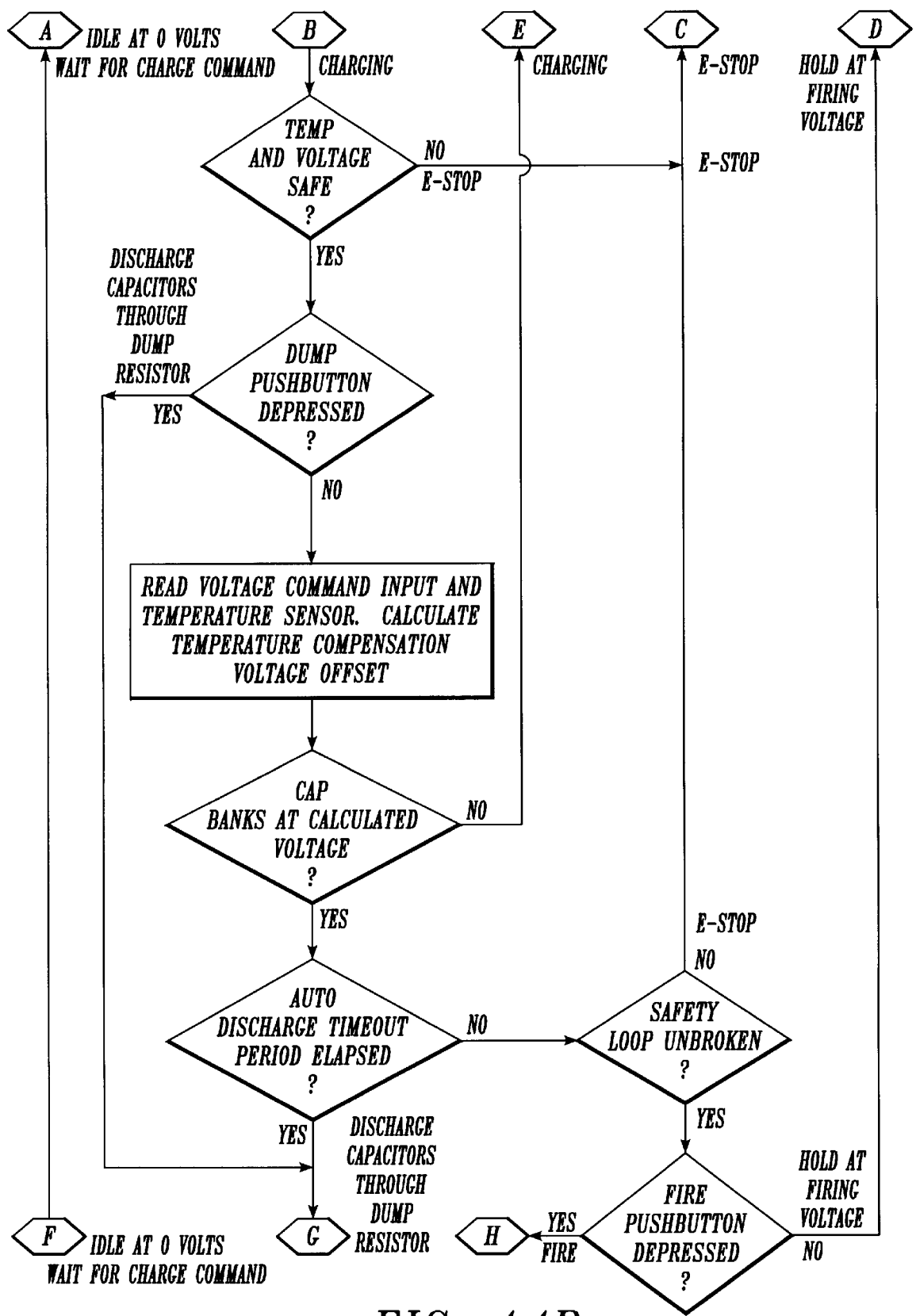
Figure 14C:
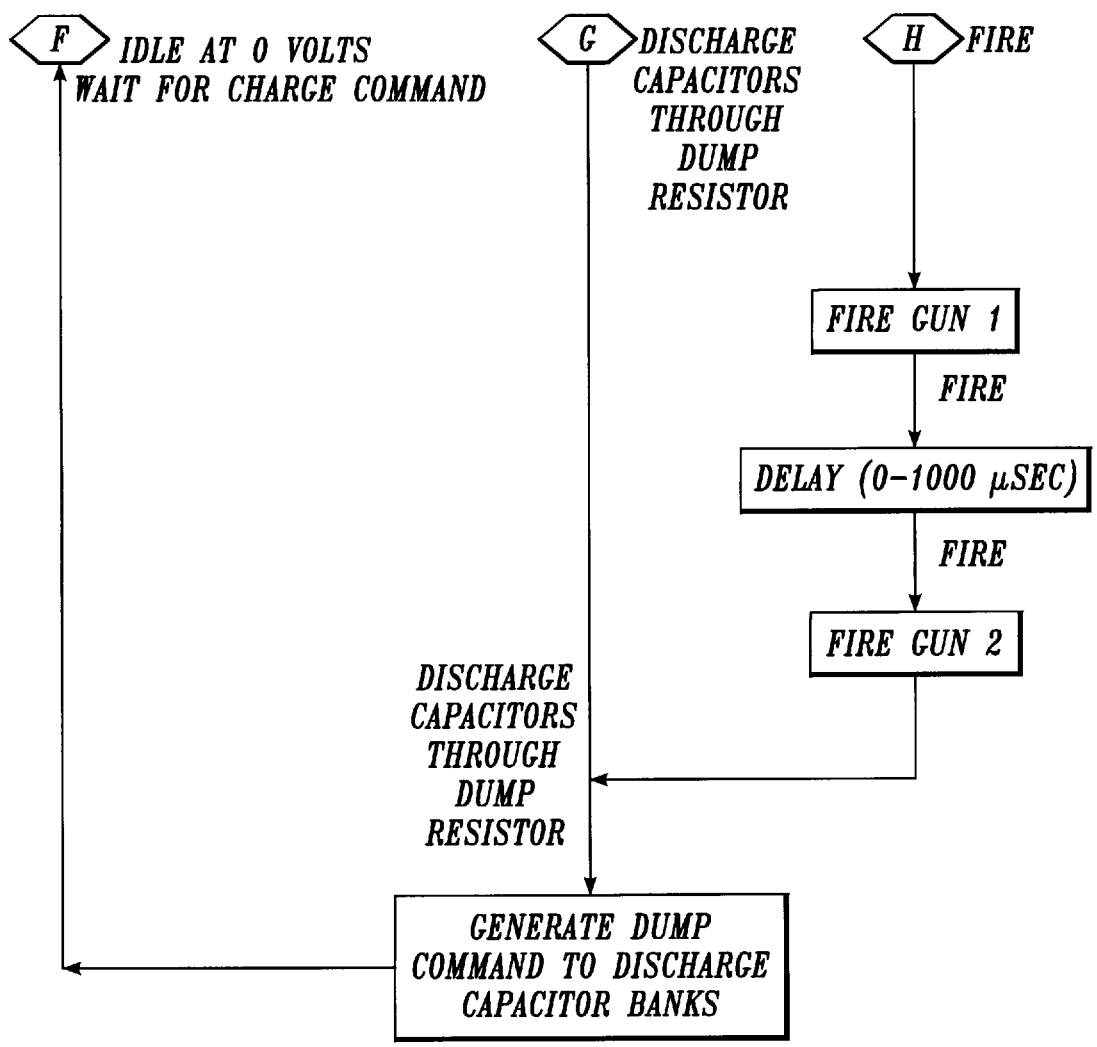

FIGS. 14A through 14C form a flow diagram illustrating the overall sequence of operation of the LVEMR illustrated in FIG. 1 and described above. After electrical power is applied, the controller 30 produces a dump command (step 1) that causes the capacitor banks to be discharged by holding the dump relay deenergized, which causes the Du contacts (FIG. 2) or the KD1–KD5 contacts (FIG. 4) to remain closed. Thereafter, or prior thereto, the right and left voltage-setting potentiometers 26 and 28 are set to the desired capacitor bank voltage levels. Also, the capacitance control switches for each capacitor bank 64 (S1–S4, FIG. 2, or SW1–SW5, FIG. 4) are set to their desired position.

Next, at Step 2, a test is made to determine if the pushbutton of the start pushbutton switch 34 has been depressed. If the start pushbutton has not been depressed, the program cycles back to Step 1. The program remains in this loop until the start pushbutton is depressed. As a result, the capacitor banks are maintained discharged.

When the pushbutton of the start pushbutton switch 34 is depressed, current flow through the start logic/E-stop circuit 38, illustrated in FIG. 6 and described above, begins. At Step 3 a test is made to determine if the safety loop 32, as shown in FIG. 6, is unbroken. The safety loop 32 is closed as long as safe operation of the LVEMR is maintained. This test is accomplished by determining if a voltage is present at the junction between the safety loop 32 and RS (FIG. 6). If no voltage is present, which means that the safety loop is broken, the program cycles to Step 1.

If the safety loop is not broken, a test (Step 4) is made to determine if the pushbutton of the charge pushbutton switch 20 has been depressed. If the charge pushbutton has not been depressed, the program cycles to Step 3. The program remains in this loop until the charge pushbutton is depressed. When the charge pushbutton is depressed, the controller produces a charge command that energizes the dump relay, which causes the Du contacts (FIG. 2) or the KD1–KD5 contacts (FIG. 4) to open. At the same time, the right and left chargers 40 and 42 are enabled, which enables the charging of the right and left capacitor banks 64 and 65 or 64' and 65'. As a result, as shown at Step 6, the capacitor banks begin to charge. Next, at Step 7, a test is made to determine if the safety loop 32 is unbroken. As noted above, the state of the safety loop is determined by testing the voltage at the junction between the safety loop 32 and RS (FIG. 6). If the safety loop is broken, the program cycles to Step 1 and the capacitor bank charges are dumped, i.e., the capacitor banks are discharged.

If the safety loop 32 is not broken, the capacitor banks 64 and 65 or 64' and 65' continue charging and the program cycles to Step 8. At Step 8, the outputs of the temperature transducers 56 and 57 and the voltage transducers 60 and 61 are tested to determine if they are below safe levels. If the output of any of the transducers is above a safe level, the program cycles to Step 1 and the capacitor banks are discharged. If the outputs of all of the transducers are below safe levels, the capacitor banks continue to charge and the program cycles to Step 9.

At Step 9 a test is made to determine if the pushbutton of the dump pushbutton switch 22 has been depressed. If the dump pushbutton has been depressed, the program cycles to Step 16, which is described below.

If the dump pushbutton has not been depressed, at Step 10 the outputs of the temperature transducers 56 and 57 are read and the readings used to calculate temperature compensation voltage offsets. More specifically, as well known to those skilled in the art, the resistance of copper increases with temperature. As a result, as temperature increases, an increased voltage is required to cause a specific amount of current to flow through a copper element, such as the coils of the rivet guns 70 and 72. Since a specific amount of rivet gun coil current is required to produce a specific amount of rivet upset force, in order to compensate for the change in coil resistance that occurs with temperature changes, the program calculates the voltage change for each rivet gun necessary to compensate for the changed resistance. The voltage compensation value is summed with the desired voltage value to produce a compensated voltage value that is adequate to produce the desired force.

Next, at Step 11, a test is made to determine if the capacitor banks have attained the compensated voltage values determined in Step 10. If the capacitor banks have not attained the compensated voltage values, the program cycles to Step 6 and charging continues. The program remains in this loop until both capacitor banks reach their compensated voltage values.

When both the capacitor banks attain their compensated voltage values, the program cycles to Step 12. At Step 12 a test is made to determine if an automatic discharge timeout period has elapsed. This test is included to prevent the capacitor banks from storing a charge for an excessive period of time. If the timeout period elapses before a fire command is received, the program cycles to Step 16, described below, whereat the capacitor banks are discharged.

If the timeout period has not elapsed, at Step 13 a test is made to determine if the safety loop 32 is unbroken.. If the safety loop 32 is broken, the program cycles to Step 1. If the safety loop 32 is not broken, a test is made (Step 14) to determine if the pushbutton of the fire pushbutton switch 24 has been depressed. If the fire pushbutton has not been depressed, the program cycles to Step 7. The program remains in this loop until the fire pushbutton is depressed or one of the heretofore-described conditions that causes the program to exit the loop occur. When the fire pushbutton is depressed, the program delay generator is enabled, causing the program to cycle to Step 15 (FIG. 14C). Step 15 includes three substeps. The first substep is the firing of one of the rivet guns. The second substep is the firing delay created by the delay generator and the third substep is the firing of the second rivet gun. The firing delay is adjustable, preferably anywhere between 0 and 1000 microseconds.

After the rivet guns fire, the program cycles to Step 16. At step 16, a dump command is generated, causing both capacitor banks to be discharged. Thereafter, the program cycles to Step 3 and Steps 3–16 are repeated.

While the presently preferred embodiment of the invention has been illustrated and described, it will be appreciated that various changes can be made therein without departing from the spirit of the invention. For example, rather than being controlled by the depression of switches and setting of potentiometers and the like, an LVEMR formed in accordance with the invention can be remotely controlled by a host robot or computer. In such an embodiment, the functions performed by the right and left voltage setting potentiometers 26 and 28, the charge, dump and fire pushbuttons 20, 22 and 24, and the safety loop 32 would be controlled by robot or computer-generated signals. The delay provided by the delay generator 44 could also be remotely controlled. Further, the status data provided by the voltage and temperature transducers and other devices could be provided to the robot or computer, as desired. In addition, recoil mechanisms other than the ones depicted in FIG. 7 can be employed in actual embodiments of the invention. For example, the shell-type recoil mechanism employed in some LVEMRs manufactured by Electroimpact, Inc., Mukilteo, Wa., can be used, if desired. Hence, within the scope of the appended claims, it is to be understood that the invention can be practiced otherwise than as specifically described herein.

The embodiments of the invention in which an exclusive property or privilege is claimed are defined as follows:

1. A low-voltage electromagnetic riveter (LVEMR) for upsetting rivets comprising:
(a) two rivet guns positionable on opposite ends of a rivet to be upset, each of said rivet guns including:
(i) a mass-mounted coil;
(ii) a driver coil juxtaposed against and connected in circuit with said mass-mounted coil, said mass-mounted coil and said driver coil wound such that current flow through said mass-mounted and driver coils creates a repulsive electromagnetic force between said coils;
(iii) a driver affixed to said driver coil on the opposite side thereof from said mass-mounted coil positionable in alignment with one end of a rivet to be upset; and
(iv) a shock absorbing mechanism located on the opposite side of said mass-mounted coil from said driver coil;
(b) a capacitor power supply connected to the mass-mounted and driver coils of said rivet guns for storing electrical power and selectively discharging electrical current into said mass-mounted and driver coils of said rivet guns, said capacitor power supply including:
(i) a plurality of separately chargeable capacitors; and
(ii) a plurality of individually controllable switches connected to said plurality of separately chargeable capacitors such that the closure of one of said switches causes the charge on an associated capacitor to be discharged into the mass-mounted and driver coils of a related one of said rivet guns: and
(c) a programmable control system connected to said plurality of individually controllable switches of said capacitor power supply for controlling the shape of the waveform of the electric current discharged into said mass-mounted and driver coils of said rivet guns by controlling the charging of said plurality of separately chargeable capacitors and applying discharge control signals to selected ones of said plurality of individually controllable switches in a preprogrammed order.

2. An LVEMR as claimed in claim 1, wherein said capacitor power supply includes first and second capacitor banks, one of said capacitor banks connected to the mass-mounted and driver coils of one of said rivet guns and the other of said capacitor banks connected to the mass-mounted and driver coils of the other of said rivet guns, each of said capacitor banks including a plurality of separately chargeable capacitors and a plurality of individually controllable switches connected to said plurality of separately chargeable capacitors such that the closure of one of said switches causes the charge on an associated capacitor to be discharged into the mass-mounted and driver coils of a related one of said rivet guns.

3. An LVEMR as claimed in claim 2, wherein said first and second capacitor banks are floating and wherein said programmable control system includes first and second ground detection circuits, one of said ground detection circuits connected to each of said first and second capacitor banks for detecting the grounding of said capacitor banks.

4. An LVEMR as claimed in claim 3, wherein said programmable controller includes:
a start switch;
an emergency stop (E-stop) switch; and
a start logic/E-stop circuit, said start switch, said E-stop switch, and said ground fault detection circuits connected in circuit with said start logic/E-stop circuit such that the charging of the plurality of separately chargeable capacitors included in said first and second capacitor banks can be controlled by the programmable control system when said start switch is closed if said emergency stop switch is closed and said ground fault detection circuits do not detect a ground fault on either of said first or second capacitor banks.

5. An LVEMR as claimed in claim 4 wherein said ground fault detection circuits include a solid state relay that is activated when a ground fault occurs on the capacitor bank to which the ground fault detector is connected.

6. An LVEMR as claimed in claim 4, wherein said programmable control system also includes a safety loop connected in circuit with said start switch, said E-stop switch and said start logic/E-stop circuit such that said programmable control system is prevented from controlling the charging of the plurality of separately chargeable capacitors included in said first and second capacitor banks if said safety loop is open.

7. An LVEMR as claimed in claim 6, wherein said programmable control system includes a delay generator for controlling the application of said discharge control signals to said selected ones of said plurality of individually controllable switches.

8. An LVEMR as claimed in claim 7, wherein said programmable control system also includes first and second firing controllers connected, respectively, between said delay generator and said plurality of individually controllable switches included in said first and second capacitor banks.

9. An LVEMR as claimed in claim 8, wherein said programmable control system also includes:
    first and second voltage-setting potentiometers;
    a charge switch;
    a fire switch;
    first and second chargers connected, respectively, to said first and second capacitor banks for charging said plurality of separately chargeable capacitors included in said first and second capacitor banks; and
    a controller connected to said first and second voltage-setting potentiometers, said charge switch, said fire switch, and said first and second chargers for causing said first and second chargers to supply a charge to said plurality of separately chargeable capacitors included in said first and second capacitor banks that causes selected ones of said plurality of separately chargeable capacitors included in said first and second capacitor banks to charge up to the voltage level set by said first and second voltage-setting potentiometers, respectively, when said charge switch is closed and for causing said delay generator to enable said first and second firing controllers when said fire switch is closed.

10. An LVEMR as claimed in claim 9, wherein said programmable control system includes first and second voltage transducers connected to said first and second capacitor banks for sensing the voltage on said selected ones of said plurality of separately chargeable capacitors included in said first and second capacitor banks and supplying a voltage magnitude signal to said controller.

11. An LVEMR as claimed in claim 10, wherein said programmable control system also includes first and second temperature transducers connected to said first and second rivet guns for sensing the temperature of said first and second rivet guns and supplying a temperature signal to said controller; and wherein said controller controls the charge level of said selected ones of said plurality of separately chargeable capacitors included in said first and second capacitor banks based in part on said temperature control signals produced by said first and second temperature transducers.

12. An LVEMR as claimed in claim 11, wherein:
    said first and second capacitor banks each include a dump circuit; and
    said programmable control system includes a dump switch connected to said controller and said controller produces a dump signal that causes said dump circuit of said first and second capacitor banks to dump the charge on the plurality of separately chargeable capacitors of said first and second capacitor banks when said dump switch is closed.

13. An LVEMR as claimed in claim 12, wherein said controller also produces said dump command when said start logic/E-stop circuit inhibits said first and second chargers from supplying a charge to said selected ones of said plurality of separately chargeable capacitors included in said first and second capacitor banks.

14. An LVEMR as claimed in claim 13, wherein said shock absorbing mechanism includes a recoil mass connected to said mass-mounted coil on the opposite side thereof from said driver coil.

15. An LVEMR as claimed in claim 14, wherein said shock absorbing mechanism also comprises a pneumatic shock absorber mounted on the opposite side of said recoil mass from said mass-mounted coil and aligned with said driver.

16. In an LVEMR as claimed in claim 15 wherein the juxtaposed surfaces of said mass-mounted and driver coils are contoured to maintain said coils in alignment prior to the electrical discharge of current into said mass-mounted and driver coils.

17. An LVEMR as claimed in claim 2, wherein said programmable control system includes a delay generator for controlling the application of said discharge control signals to said selected ones of said plurality of individually controllable switches.

18. An LVEMR as claimed in claim 17, wherein said programmable control system also includes first and second firing controllers connected, respectively, between said delay generator and said plurality of individually controllable switches included in said first and second capacitor banks.

19. An LVEMR as claimed in claim 2, wherein said programmable control system also includes:
    first and second voltage-setting potentiometers;
    a charge switch;
    a fire switch;
    first and second chargers connected, respectively, to said first and second capacitor banks for charging said plurality of separately chargeable capacitors included in said first and second capacitor banks; and
    a controller connected to said first and second voltage-setting potentiometers, said charge switch, said fire switch, and said first and second chargers for causing said first and second chargers to supply a charge to said plurality of separately chargeable capacitors included in said first and second capacitor banks that causes selected ones of said plurality of separately chargeable capacitors included in said first and second capacitor banks to charge up to the voltage level set by said first and second voltage-setting potentiometers, respectively, when said charge switch is closed and for causing said delay generator to enable said first and second firing controllers when said fire switch is closed.

20. An LVEMR as claimed in claim 19, wherein said programmable control system includes first and second voltage transducers connected to said first and second capacitor banks for sensing the voltage on said selected ones of said plurality of separately chargeable capacitors included in said first and second capacitor banks and supplying a voltage magnitude signal to said controller.

21. An LVEMR as claimed in claim 20, wherein said programmable control system also includes first and second temperature transducers connected to said first and second rivet guns for sensing the temperature of said first and second rivet guns and supplying a temperature signal to said controller; and wherein said controller controls the charge level of said selected ones of said plurality of separately chargeable capacitors included in said first and second capacitor banks based in part on said temperature control signals produced by said first and second temperature transducers.

22. An LVEMR as claimed in claim 19, wherein said programmable control system also includes first and second temperature transducers connected to said first and second rivet guns for sensing the temperature of said first and second rivet guns and supplying a temperature signal to said controller; and wherein said controller controls the charge level of said plurality of separately chargeable capacitors included in said first and second capacitor banks based in part on said temperature control signals produced by said first and second temperature transducers.

23. An LVEMR as claimed in claim 2, wherein:
said first and second capacitor banks each include a dump circuit; and
said programmable control system includes a dump switch connected to said programmable control system and said programmable control system produces a dump signal that causes said dump circuit of said first and second capacitor banks to dump the charge on the plurality of separately chargeable capacitors of said first and second capacitor banks when said dump switch is closed.

24. An LVEMR as claimed in claim 2, wherein said shock absorbing mechanism includes a recoil mass connected to said mass-mounted coil on the opposite side thereof from said driver coil.

25. An LVEMR as claimed in claim 24, wherein said shock absorbing mechanism also comprises a pneumatic shock absorber mounted on the opposite side of said recoil mass from said mass-mounted coil and aligned with said driver.

26. In an LVEMR as claimed in claim 2 wherein the juxtaposed surfaces of said mass-mounted and driver coils are contoured to maintain said coils in alignment prior to the electrical discharge of current into said mass-mounted and driver coils.

27. In a low-voltage electromagnetic riveter (LVEMR) for upsetting rivets including two rivet guns positionable on opposite ends of a rivet to be upset that produce an electromagnetic force that drives a driver against the ends of the rivet to be upset, a capacitor power supply for supplying power to said rivet guns that causes said rivet guns to produce said electromagnetic force and a control system for controlling the application of power by said capacitor power supply to said rivet guns, the improvement comprising:
(a) said capacitor power supply including:
   (i) a capacitor bank formed of a plurality of separately chargeable capacitors; and
   (ii) a plurality of individually controllable switches connected to said plurality of separately chargeable capacitors such that the closure one of said switches causes the charge on an associated capacitor to be discharged to said rivet guns; and
(b) said control system being connected to said capacitor power supply for controlling the shape of the waveform of the electric power supplied to said rivet guns by controlling the charging of said plurality of separately chargeable capacitors and applying discharge control signals to selected ones of said plurality of individually controllable switches in a preprogramed order.

* * * * *

UNITED STATES PATENT AND TRADEMARK OFFICE
CERTIFICATE OF CORRECTION

PATENT NO. : 5,813,110
DATED : September 29, 1998
INVENTOR(S) : P.R. Arntson et al.

It is certified that error appears in the above-identified patent and that said Letters Patent is hereby corrected as shown below:

| COLUMN | LINE | |
|---|---|---|
| [54] col. 1 | Title | "ELETROMAGNETIC" should read --ELECTROMAGNETIC-- |
| 22 (Claim 27, | 25 line 15) | after "closure" insert --of-- |

Signed and Sealed this

Second Day of March, 1999

Attest:

Q. TODD DICKINSON

*Attesting Officer*  Acting Commissioner of Patents and Trademarks